United States Patent
Suk et al.

(10) Patent No.: US 8,804,669 B2
(45) Date of Patent: Aug. 12, 2014

(54) METHODS AND APPARATUSES FOR TRANSMITTING AND RECEIVING CHANNEL QUALITY INDICATOR (CQI) IN BROADBAND WIRELESS COMMUNICATION SYSTEM

(75) Inventors: Won-Kyun Suk, Suwon-si (KR); Keun-Chul Hwang, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 747 days.

(21) Appl. No.: 12/587,069

(22) Filed: Oct. 1, 2009

(65) Prior Publication Data

US 2010/0085931 A1    Apr. 8, 2010

(30) Foreign Application Priority Data

Oct. 2, 2008  (KR) .................. 10-2008-0096963

(51) Int. Cl.
*H04W 4/00*         (2009.01)
(52) U.S. Cl.
USPC ........... 370/332; 370/230; 370/233; 370/348; 370/438; 455/115.1; 455/226.2
(58) Field of Classification Search
USPC ......... 370/230, 247, 248, 278, 282, 322, 329, 370/332, 333, 341, 342–343, 348, 438, 439, 370/441, 442; 455/115.1, 115.2, 115.3, 24, 455/226.2, 70, 68, 67.14
See application file for complete search history.

(56) References Cited

U.S. PATENT DOCUMENTS

| | | | |
|---|---|---|---|
| 2005/0201295 A1* | 9/2005 | Kim et al. ..................... | 370/241 |
| 2005/0201309 A1* | 9/2005 | Kang et al. .................... | 370/310 |
| 2006/0094436 A1* | 5/2006 | Kim et al. ..................... | 455/450 |
| 2012/0082116 A1* | 4/2012 | Kwon et al. .................. | 370/329 |

FOREIGN PATENT DOCUMENTS

| | | |
|---|---|---|
| KR | 10-0606083 | 7/2006 |
| KR | 10-2007-0015897 | 2/2007 |
| KR | 10-2009-0051998 | 5/2009 |
| KR | 10-0946923 | 3/2010 |

* cited by examiner

*Primary Examiner* — Kibrom T Hailu
*Assistant Examiner* — Zewdu A Beyen

(57) ABSTRACT

A terminal is operable to transmit and receive CQI in a broadband wireless communication system. An operating method of the terminal for transmitting a CQI in a broadband wireless communication system includes requesting a band Adaptive Modulation and Coding (AMC) subchannel to a base station; after requesting the band AMC subchannel, transmitting a broadband CQI to the base station over a first control channel; and transmitting a first differential CQI relating to a band AMC allocated using the broadband CQI, over a second control channel. Thus, the overhead in the CQI feedback can be minimized and the CQI reception performance can be enhanced through the most robust encoding.

36 Claims, 7 Drawing Sheets

METHODS AND APPARATUSES FOR TRANSMITTING AND RECEIVING CHANNEL QUALITY INDICATOR (CQI) IN BROADBAND WIRELESS COMMUNICATION SYSTEM

CROSS-REFERENCE TO RELATED APPLICATION(S) AND CLAIM OF PRIORITY

The present application claims the benefit under 35 U.S.C. §119 to an application filed in the Korean Intellectual Property Office on Oct. 2, 2008 and assigned Serial No. 10-2008-0096963, the contents of which are incorporated hereby by reference.

TECHNICAL FIELD OF THE INVENTION

The present invention relates generally to methods and apparatuses for transmitting a Channel Quality Indicator (CQI) in a broadband wireless communication system. More particularly, the present invention relates to methods and apparatuses for transmitting and receiving the CQI of sub-bands in an Orthogonal Frequency Division Multiple Access (OFDMA) system.

BACKGROUND OF THE INVENTION

A radio channel experiences severe channel changes according to the time, compared to the wired channel. To achieve a required performance, an optimum transmission scheme (a modulation scheme, a code rate, a transmit power, and so forth) is determined in every transmission time. In order to accomplish this, a base station needs to acquire accurate channel information of each individual terminal. In an Institute of Electrical and Electronics Engineers (IEEE) 802.16 system, the terminal periodically reports its measured channel information of the downlink to the base station over a CQI channel.

Meanwhile, since the feedback of the CQI information requires at least one frame in a Time Division Multiplexing (TDM) system, the time point of the channel quality measurement by the terminal is different from the time point of the actual data transmission in the downlink. Accordingly, in a wireless channel environment under the severe channel variation based on the time, the CQI information includes some error and thus the performance degradation is caused. Namely, when the channel quality further degrades in the channel measurement of the terminal and in the actual signal reception, the transmission error is caused. In addition, the base station may not receive the CQI information because of the influence of the serious fading or the strong interference signal and may degrade the system performance. In the former case, to mitigate the performance degradation caused by the channel variation according to the time, a retransmission scheme such as Hybrid-Automatic Repeat Request (H-ARQ) is adopted. In the latter case, the error of the information bits can be minimized by applying a more robust code rate to the control information such as CQI information. The IEEE 802.16 system supports two CQI channel operation manners according to a subchannel allocation scheme; that is, supports a case where a diversity subchannel is allocated and a case where a band Adaptive Modulation and Coding (AMC) subchannel is allocated. The meaning of the CQI channel differs in each case. That is, when the CQI information relating to a plurality of bands is transmitted, much information is required to transmit the unique CQI value of each band.

In the IEEE 802.16 system, the terminal sends a REP-RSP message to the base station for the allocation of the band AMC subchannel. When the base station does not correctly receive the REP-RSP message, it regards a Carrier to Interference and Noise Ratio (CINR) value (or the CQI information) relating to a certain band sent from the terminal as an average CINR of the entire channel. As a result, the base station may not reflect the accurate CINR value and the performance degradation are caused.

The REP-RSP message includes a Media Access Control (MAC) header and a Cyclic Redundancy Check (CRC) in the form of a MAC message, which leads to the considerable overhead. To reduce the overhead, a feedback header type may be utilized. However, this may degrade the performance as well when the base station does not correctly receive the feedback header type.

The CQI information transmission of the selected band causes the overhead in that the information of the selected band needs to be transmitted every time its modification is required. When the base station merely schedules with the selected band, the optimum scheduling for the unreported band is impossible because the entire band may not be filled only with the bands selected by the terminal.

Therefore, what is needed are methods and apparatuses for minimizing the overhead in the CQI transmission and for minimizing the error in the broadband wireless communication system.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide a method and apparatus for minimizing overhead and transmitting and receiving a Channel Quality Indicator (CQI) in a broadband wireless communication system.

Another aspect of the present invention is to provide a transmitting and receiving method and apparatus for enhancing a CQI reception performance in a broadband wireless communication system.

Yet another aspect of the present invention is to provide a transmitting and receiving method and apparatus for efficient scheduling in a broadband wireless communication system.

According to one aspect of the present invention, an operating method of a terminal for transmitting a CQI in a broadband wireless communication system includes requesting a band Adaptive Modulation and Coding (AMC) subchannel to a base station; after requesting the band AMC subchannel, transmitting a broadband CQI to the base station over a first control channel; and transmitting a first differential CQI relating to a band AMC allocated using the broadband CQI, over a second control channel.

According to another aspect of the present invention, an operating method of a base station for transmitting a CQI in a broadband wireless communication system includes to allocate a band AMC subchannel to a terminal, receiving a broadband CQI from the terminal over a first control channel; after receiving the broadband CQI, receiving a first differential CQI over a second control channel; and updating the CQI using the broadband CQI and the first differential CQI.

According to yet another aspect of the present invention, an apparatus of a terminal for transmitting a CQI in a broadband wireless communication system includes a controller for requesting a band AMC subchannel; and a CQI determiner for, after the band AMC subchannel is requested, generating and transmitting a broadband CQI over a first control channel, and generating and transmitting a first differential CQI relating to an allocated band AMC over a second control channel.

According to still another aspect of the present invention, an apparatus of a base station for transmitting a CQI in a broadband wireless communication system includes a CQI manager for, to allocate a band AMC subchannel to a terminal, receiving a broadband CQI over a first control channel and receiving a first differential CQI over a second control channel from the terminal after receiving the broadband CQI; and a differential CQI checker for updating the CQI using the broadband CQI and the first differential CQI.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Preferred embodiments of the present invention will be described herein below with reference to the accompanying drawings. In the following description, well-known functions or constructions are not described in detail since they would obscure the invention in unnecessary detail. Terminologies described below are defined with consideration of functions in the present invention, and can change depending on the intention or practice of a user or operator. Therefore, the definitions should be determined on the basis of the descriptions over the specification.

Exemplary embodiments of the present invention provide methods and apparatuses for minimizing overhead and safely transmitting and receiving a Channel Quality Indicator (CQI) in a broadband wireless communication system.

When a base station allocates a CQI channel to a terminal in the broadband wireless communication system, the terminal feeds the CQI represented with 5-bit or 6-bit information back to the base station over the CQI channel. The information transmittable using the 5-bit or 6-bit information may employ 32 code words (25) or 64 code words (26). Herein, unused code words of 32 or 64 code words are newly defined for the sake of the transition between a normal subchannel mode and a band Adaptive Modulation and Coding (AMC) subchannel mode. In particular, three code words are referred to as C1, C2, and C3 respectively and defined as follows. Herein, the normal subchannel mode determines a Modulation and Coding Scheme (MCS) level of the uplink and the downlink merely with an average Carrier to Interference and Noise Ratio (CINR) measurement value, and the band AMC subchannel mode determines per band CINR value using a REPort (REP)-REQuest (REQ) message and a REP-ReSPonse (RSP) message for the channel measurement.

The C1 is a code word used for the terminal to request the transition from the normal subchannel mode to the band AMC subchannel mode to the base station. The C2 is a code word used for the terminal to inform of the broadband CQI transmission of the band AMC subchannel mode after the REP-REQ reception. The C3 is a code word sent from the terminal to the base station to switch from the band AMC subchannel mode to the normal subchannel mode.

In the broadband wireless communication system, the base station receives the CINR measured and fed back by the terminal and uses the mapping CQI. Hereinafter, the CINR and the CQI are treated the same.

Figure 1:
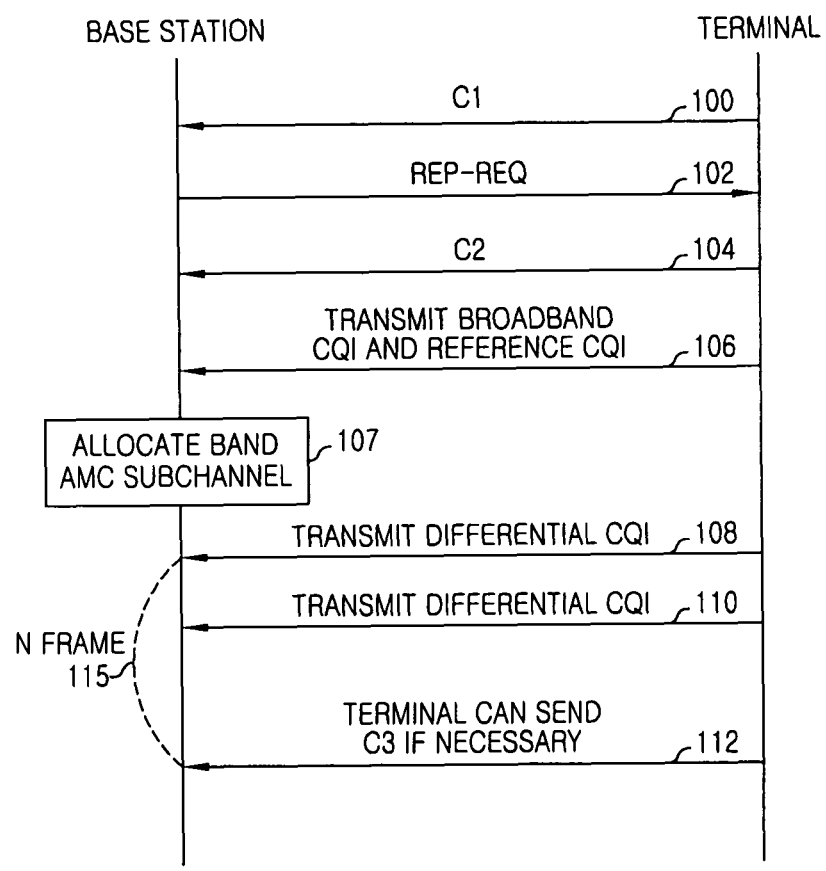
FIG. 1 illustrates a flowchart of a method for transmitting and receiving CQI in a broadband wireless communication system according to an exemplary embodiment of the present invention.

FIG. 1 illustrates a method for transmitting and receiving the CQI in the broadband wireless communication system according to an exemplary embodiment of the present invention.

In step 100, the terminal sends the C1 to the base station over the CQI channel (or a fast feedback channel) to request the transition from the normal subchannel mode to the band AMC subchannel mode.

In step 102, the base station sends the REP-REQ message to the terminal to request the per band CQI.

The terminal sends the C2 signal to the base station in the CQI channel to confirm the broadband CQI transmission in response to the REP-REQ message in step 104, and transmits the broadband CQI (or a reference CQI) to the base station over the CQI channel or the fast feedback channel in step 106. In various implementations, the C2 signal and the broadband CQI can be transmitted at the same time by allocating two CQI channels.

Provided that the entire system band is divided into a plurality of bands, the broadband CQI indicates the CQI for the entire band. The average or median value of the CQIs measured on the band basis in the entire band can be selected as the broadband CQI. The broadband CQI is encoded with information of certain bits (e.g., 5 bits in the IEEE 802. 16) as the reference CQI value for the differential CQI. The certain bit information is coded robustly and transmitted to the base station in the CQI channel. Only 5 bits are encoded as the reference value, rather than transmitting the per band CQI value using the REP-RSP message. Thus, the transmission of the fast feedback channel of the strongest code rate is feasible.

Upon receiving the broadband CQI, the base station allocates the band AMC subchannel in step 107. The terminal sends the differential CQI to the base station within a certain period (N frames 115) in steps 108 and 110. In step 112, the terminal sends the C3 to the base station in the N frames 115 of the certain period to transit from the band AMC subchannel mode to the normal subchannel mode if necessary.

The reference CQI of step 106 is compared with the currently measured CQI. When the reference CQI is greater than the current CQI, the differential CQI is set to '0'. When the reference CQI is less than the current CQI, the differential CQI is set to '1'. Next, the differential CQI is transmitted in a certain bit size (the IEEE 802. 16 defines 5 bits) over the CQI channel. In various implementations, when the CQI channel is used as the fast feedback channel, the 6-bit size is allowed and the differential CQI transmission with respect to 6 bands is possible.

The terminal stores the per band CQI reported to the base station using the reference CQI and the differential CQI of step 106. Herein, rather than constantly changing the reference CQI, the terminal calculates the differential CQI by comparing the per band CQI reported to the base station and the currently calculated per band CQI, reports the calculated differential CQI to the base station, and updates the current per band CQI reported. Next, the terminal calculates the differential CQI using the updated per band CQI in steps 108 and 110.

When the 6 bits are used to deliver in the fast feedback channel, they may overlap with existing signals defined for the band AMC operation. This problem may be addressed by determining a transmission period in advance not to overlap the existing signal (e.g., C1, C2 and C3) transmission for the band AMC operation and the transmission of the differential CQI and the reference CQI.

For example, when the base station defines the entire band to 6 logical bands, the reference CQI is defined as the average value of the 6 bands, the reference CQI is transmitted to the base station using one fast feedback channel instead of the REP-RSP message, and the differential CQI relating to the 6 bands is transmitted in the fast feedback channel. When the terminal wants to transit to the normal subchannel in the process of the band AMC operation, the terminal can send the C3 signal to the base station by preset periods if necessary and the base station can identify the information delivered over the CQI channel in the corresponding frame as the C3 signal. Alternatively, by additionally allocating the CQI channel to the terminal for the signal transmission of the band AMC operation by the set periods, the differential CQI information and the C3 signal can be transmitted to the base station at the same time.

Next, this process is finished.

As stated above, the terminal sends the C1 signal to the base station to switch from the normal subchannel mode to the band AMC mode, and the base station sends the REP-REQ message requesting the per band CQI to the terminal. The terminal, upon receiving the REP-REQ message, sends the C2 signal in response to the REP-REQ message and transmits the reference CQI in the CQI channel. Next, the base station allocates the band subchannel. After the band subchannel is allocated, the terminal generates the differential CQI by comparing the previously transmitted reference CQI and the current per band CQI and transmits the differential CQI over the CQI channel. The base station acquires the per band CQI using the reference CQI and the per band differential CQI and updates the per band CQI only with the per band differential CQI during a certain period.

Figure 2:
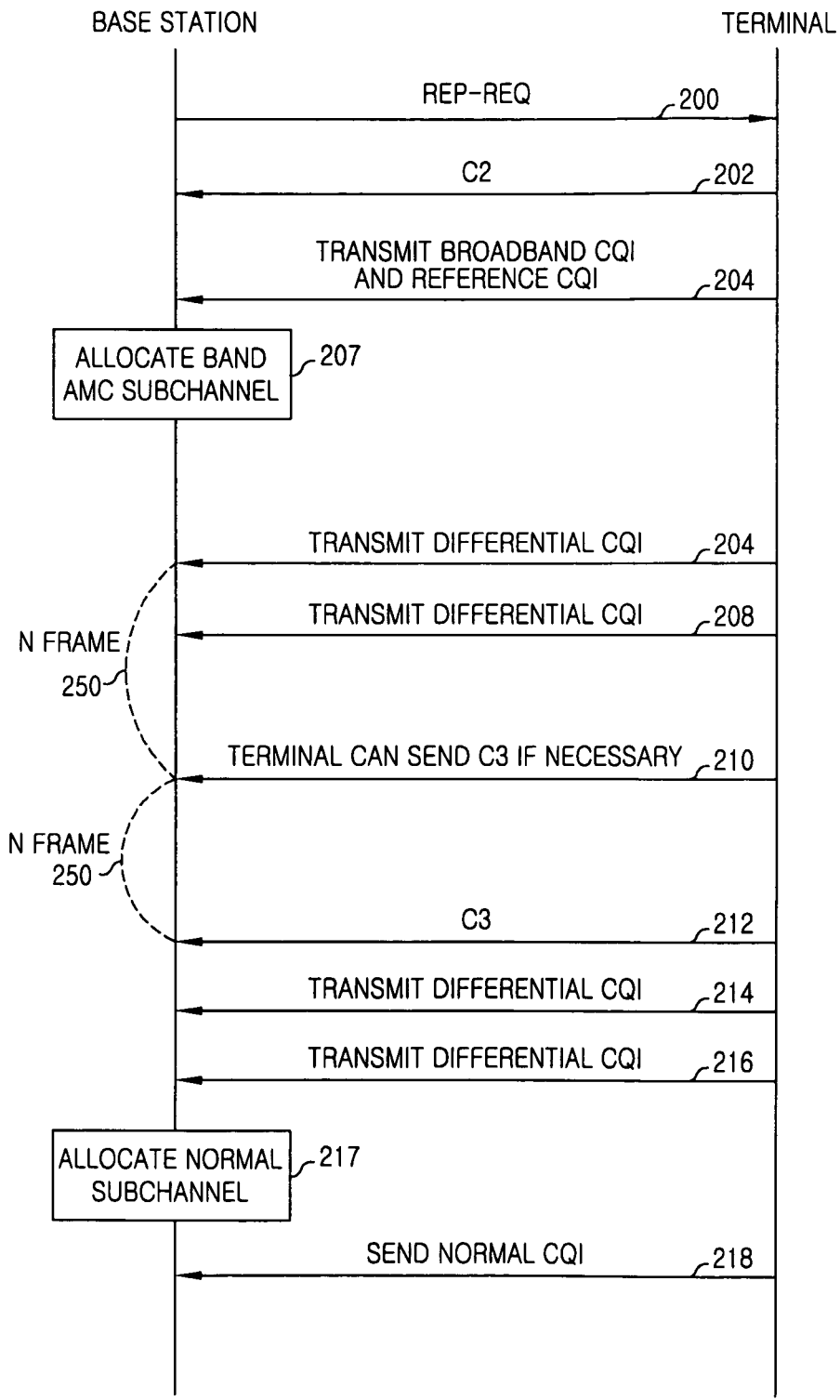
FIG. 2 illustrates a flowchart of the method for transmitting and receiving the CQI in the broadband wireless communication system according to an exemplary embodiment of the present invention.

FIG. 2 illustrates the CQI transmitting and receiving method in the broadband wireless communication system according to an exemplary embodiment of the present invention.

When the base station allocates the band AMC subchannel, the base station sends the REP-REQ message requesting the per band CQI to the terminal in step 200. Steps 202 through 210 are the same as steps 104 through 112 of FIG. 1.

When the terminal wants the normal subchannel allocation, the terminal requests the normal subchannel allocation to the base station by sending the C3 signal over the CQI channel by the set transmission periods 250 in every N frame in step 212. The terminal transmits the differential CQI in steps 214 and 216 until the normal subchannel is allocated.

The base station allocates the normal subchannel in step 217. The terminal, which is allocated the normal subchannel, sends the normal CQI of the entire band in step 218.

Next, the process is finished.

Figure 3:
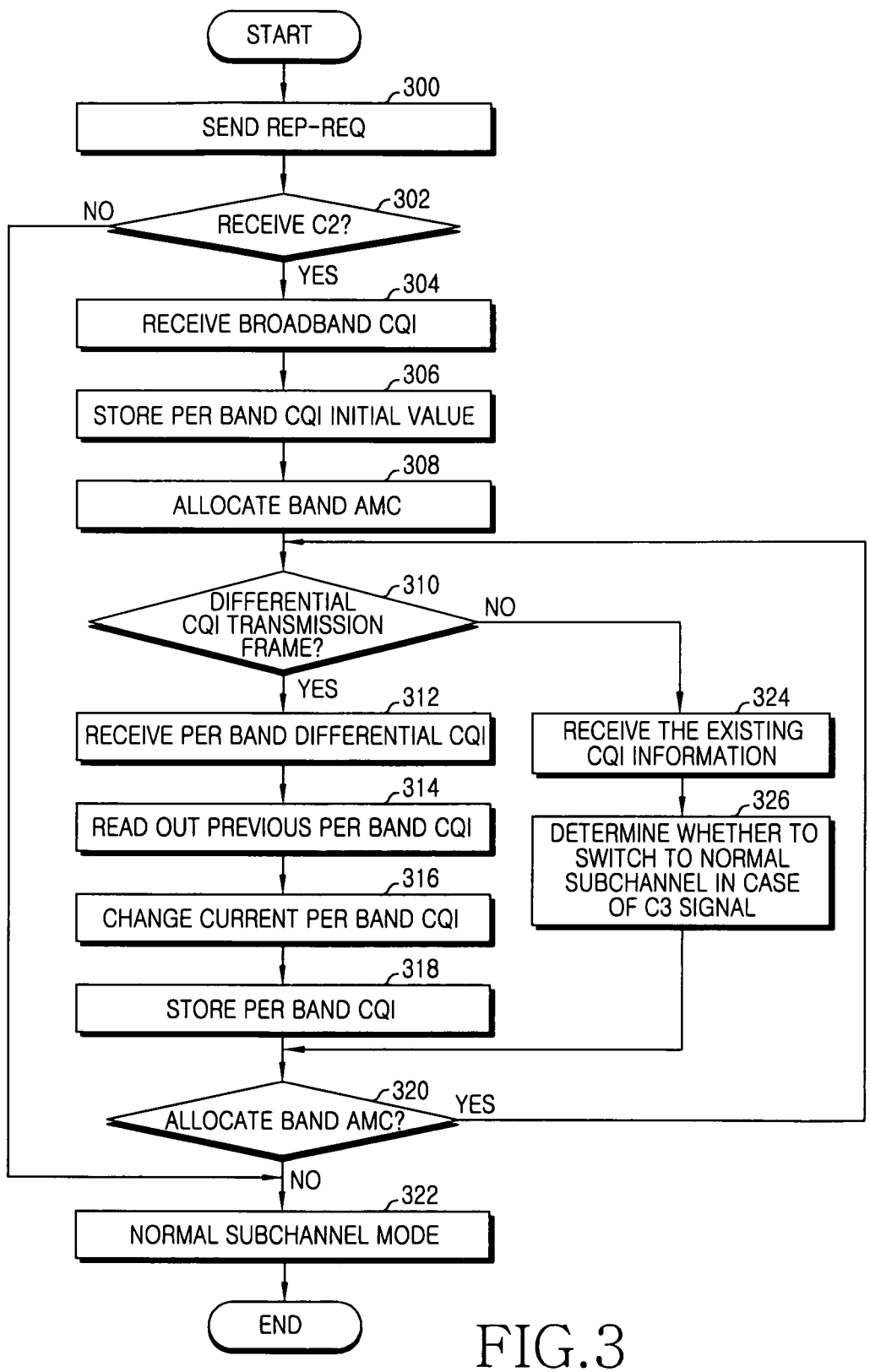
FIG. 3 illustrates a flowchart of operations of a base station for transmitting and receiving the CQI in the broadband wireless communication system according to an exemplary embodiment of the present invention.

FIG. 3 illustrates a flowchart of the operations of the base station for transmitting and receiving the CQI in the broadband wireless communication system according to an exemplary embodiment of the present invention.

To operate in the band AMC mode, the base station sends the REP-REQ message requesting the per band CQI to the terminal in step 300. In various implementations, the terminal may request the base station to operate in the band AMC mode by transmitting the C1 in the CQI channel (not shown).

When not receiving the C2 from the terminal in step 302, the base station functions in the normal subchannel mode in step 322.

When receiving the C2 from the terminal in step 302, the base station receives the broadband CQI (or the reference CQI) over the CQI channel in step 304 and stores the per band CQI initial value in step 306. The per band CQI initial value is set to the reference CQI. In step 308, the base station allocates the band AMC.

At the differential CQI frame transmission time in step 310, the base station receives the per band differential CQI over the CQI channel in step 312, reads out the per band CQI pre-stored in step 314, updates the current per band CQI by referring to the received per band differential CQI in step 316, and stores the updated per band CQI in step 318.

When it is not the differential CQI frame transmission time in step 310; that is, when it is the C3 transmission period time, the base station receives the existing normal subchannel CQI over the CQI channel in step 324. As for the C3 signal, the base station determines whether to transit from the band AMC subchannel mode to the normal subchannel mode in step 326.

To allocate the band AMC subchannel in step 320, the base station proceeds to step 310. Not to allocate the band AMC subchannel, the base station operates in the normal subchannel mode in step 322.

Next, the base station finishes this process.

Figure 4A:
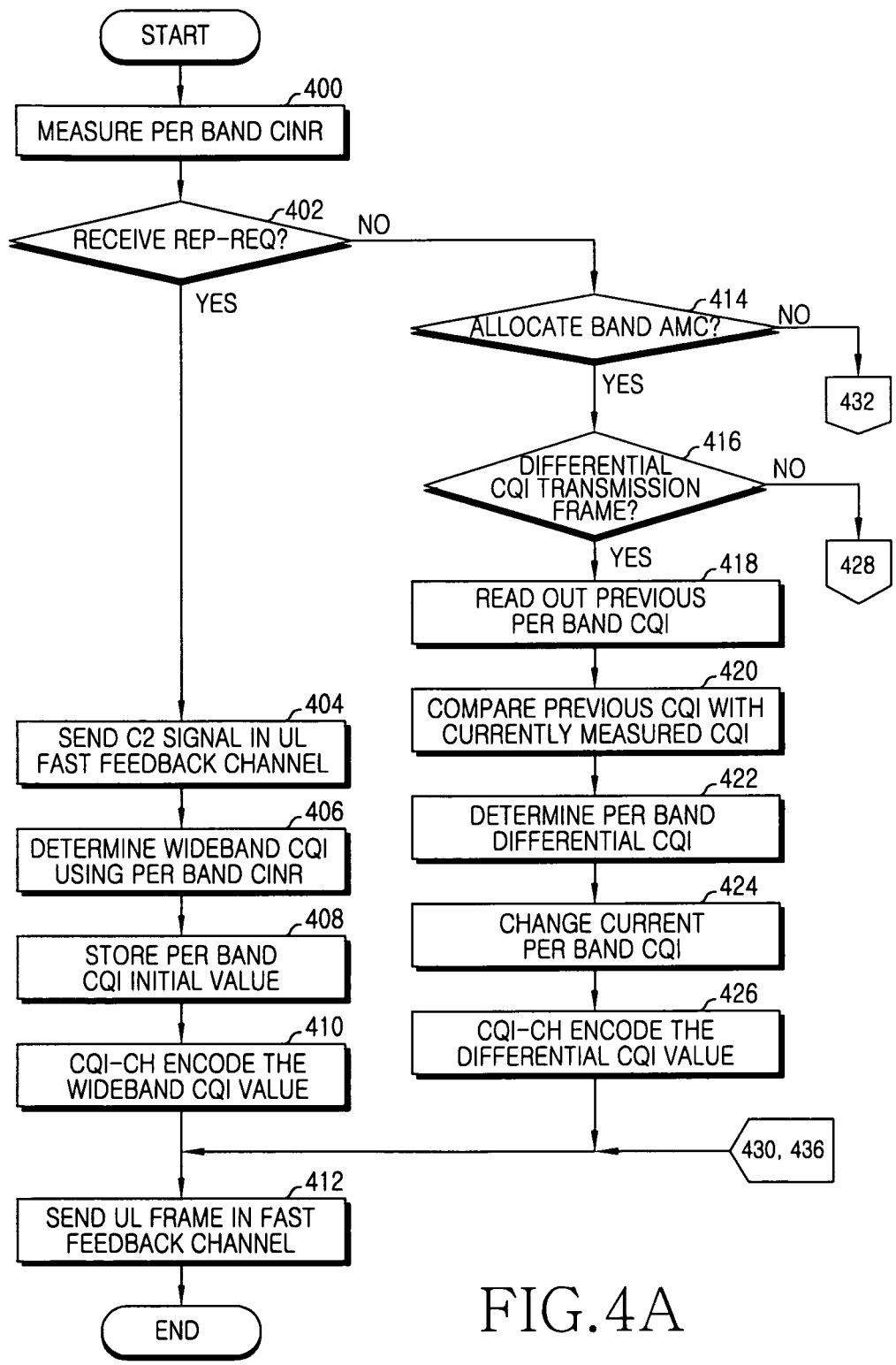
FIGS. 4A and 4B illustrate flowcharts of operations of a terminal for transmitting and receiving the CQI in the broadband wireless communication system according to an exemplary embodiment of the present invention.
Figure 4B:
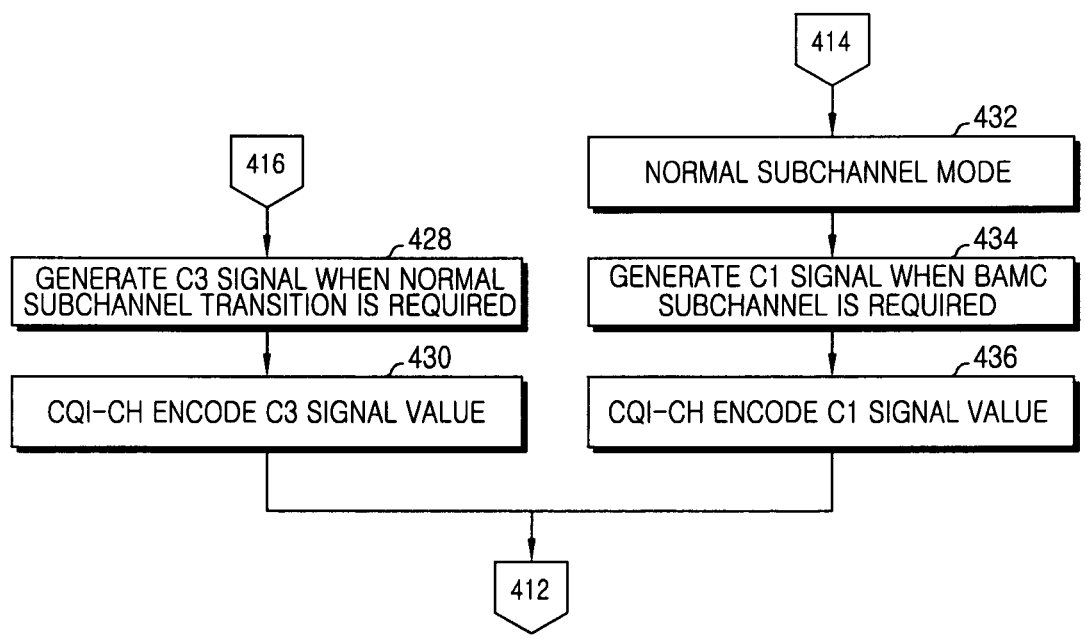

FIGS. 4A and 4B are flowcharts of the operations of the terminal for transmitting and receiving the CQI in the broadband wireless communication system according to an exemplary embodiment of the present invention.

In step 400, the terminal measures the per band CINR. When receiving the REP-REQ message from the base station in step 402, the terminal sends the C2 signal to the base station through the CQI channel or the fast feedback channel in step 404.

The terminal determines the average value or the median value of the per band CINR values as the broadband CQI in step 406 and stores the per band CQI initial value in step 408. The per band CQI initial value may be determined according to the CINR value measured per band in step 400 or as the broadband CQI value.

In step 410, the terminal robustly encodes the broadband CQI in the fast feedback channel.

When not receiving the REP-REQ message in step 402, the terminal checks for the per band AMC subchannel allocation in step 414. In the per band AMC subchannel allocation, the terminal confirms the differential CQI transmission time in step 416, reads out the previous per band CQI at the differential CQI transmission time in step 418, and compares the measured CQI and the previous CQI read in step 420. In step 422, when the measured per band CQI is greater than the previous CQI, the terminal sets the per band differential CQI to '1'. When the measured per band CQI is less than the previous CQI, the terminal sets the per band differential CQI to '0'. Next, the terminal changes to the current per band CQI in step 424 and channel-encodes the differential CQI in step 426.

When the per band subchannel is not allocated in step 414, the terminal operates in the normal subchannel mode in step 432, generates the C1 signal to request the per band AMC subchannel allocation in step 434, and channel-encodes the C1 in step 436.

By contrast, when it is not the differential CQI transmission time in step 416, the terminal generates the C3 to switch from the band AMC subchannel mode to the normal subchannel mode in step 428 and channel-encodes the C3 in step 430.

In step 412, the terminal transmits the channel-encoded CQI of step 410, the channel-encoded differential CQI of step 426, the channel-encoded C3 of step 430, or the channel-encoded C1 of step 436 to the base station over the CQI channel or the fast feedback channel.

Next, the terminal finishes this process.

Figure 5:
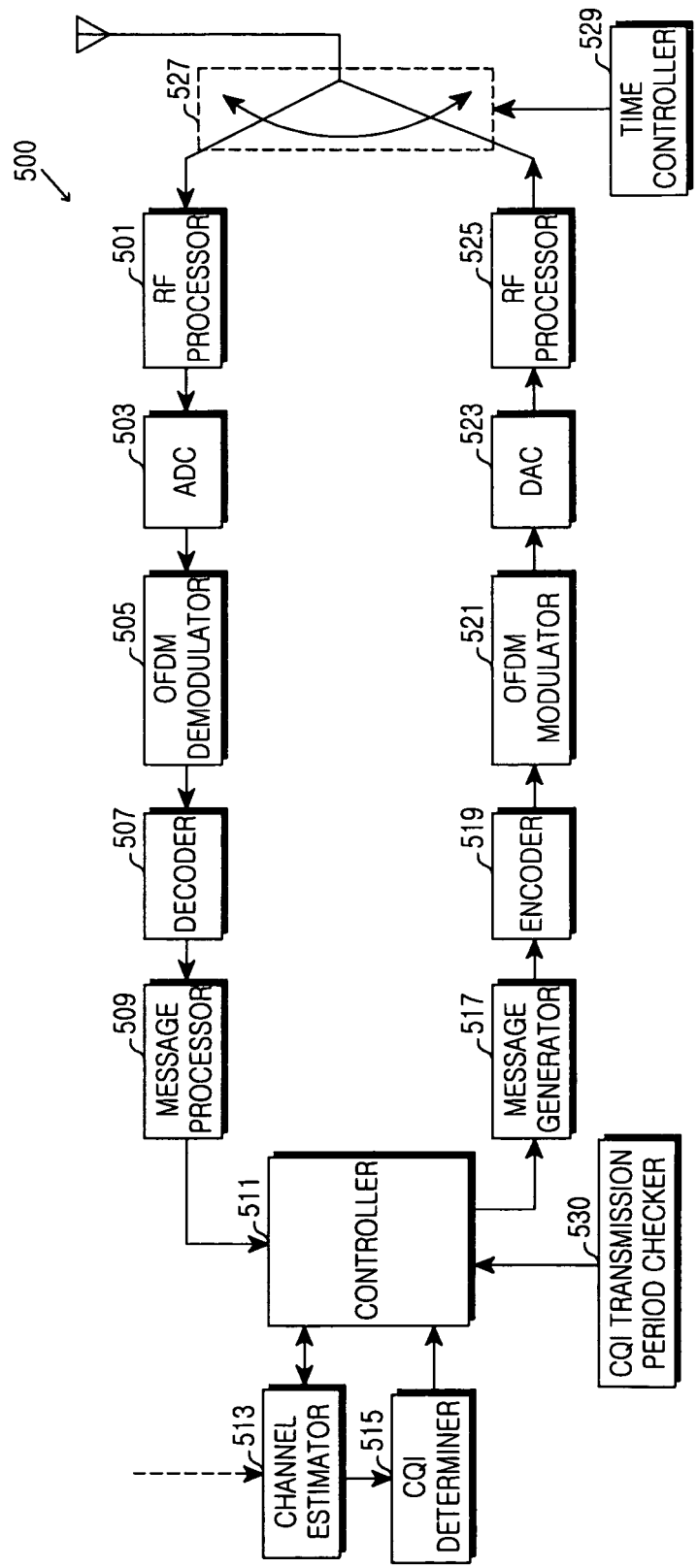
FIG. 5 illustrates a block diagram of the terminal for transmitting and receiving the CQI in the broadband wireless communication system according to an exemplary embodiment of the present invention.

FIG. 5 illustrates the terminal for transmitting and receiving the CQI in the broadband wireless communication system according to an exemplary embodiment of the present invention.

The terminal 500 includes a Radio Frequency (RF) processor 501, an Analog/Digital Converter (ADC) 503, an Orthogonal Frequency Division Multiplexing (OFDM) demodulator 505, a decoder 507, a message processor 509, a controller 511, a channel estimator 513, a CQI determiner 515, a message generator 517, an encoder 519, an OFDM modulator 521, a Digital/Analog Converter (DAC) 523, an RF processor 525, and a CQI transmission period checker 530.

A time controller 529 controls the switching operation of a switch based on the frame synchronization. For example, in the signal reception interval, the time controller 529 controls the switch to interconnect an antenna and the RF processor 501 of the receiving stage. In the signal transmission interval, the time controller 529 controls the switch to interconnect the antenna and the RF processor 525 of the transmitting stage.

In the reception interval, the RF processor 501 down-converts an RF signal received via the antenna to a baseband analog signal. The ADC 503 converts the analog signal output from the RF processor 501 to a digital signal. The OFDM demodulator 505 converts the time-domain signal output from the ADC 503 to a frequency-domain signal using a Fast Fourier Transform (FFT) process. The decoder 507 can select data of subcarriers to receive from the frequency-domain data output from the OFDM demodulator 505, and can demodulate and decodes the selected data at a preset modulation level (MCS level).

The message processor 509 decomposes the control message provided from the decoder 507 and provides the result to the controller 511. For example, the message processor 509 decomposes the REP-REQ message requesting the per band CQI and provides the result to the controller 511.

The controller 511 can control the terminal. The controller 511 performs the corresponding processing according to the result provided from the message processor 509. For example, to prepare for the band AMC operation, the controller 511 sends the first control signal to the base station to request the transition from the normal subchannel mode to the band AMC subchannel mode, receives the report request message requesting to measure the per band CQI from the base station, and sends the second control signal informing of the broadband CQI transmission with respect to the per band CQI measurement.

When the base station wants the band AMC operation, the controller 511 receives the report request message requesting to measure the per band CQI from the base station and sends the second control signal informing of the broadband CQI transmission in relation to the per band CQI measurement.

The controller 511 can be assigned the band AMC subchannel and transmits and receives data.

After sending the first differential CQI, the controller 511 can compare the per band CQI according to the previous differential CQI and the currently measured per band CQI and sends the second differential CQI. To switch from the band AMC subchannel mode to the normal subchannel mode, the controller 511 sends the third control signal in the defined period.

The CQI determiner 515 receives the per band CINR value from the channel estimator 513 which estimates the channel based on the pilot, and determines the CQI value. Prior to the band AMC operation, the CQI determiner 515 generates and transmits the broadband CQI over the first corresponding channel, and generates and transmits the first differential CQI over the second corresponding channel. The broadband CQI is selected to the average or median value of the CQIs measured per band, and encoded with certain bits as the reference CQI for the differential CQI. The first and second corresponding channels are the CQI channel or the fast feedback channel.

The message generator 517 generates the message using the control information provided from the controller 511.

The encoder 519 encodes and modulates the signal output from the message generator 517 at the preset modulation level (MCS level).

The OFDM modulator 521 converts the frequency-domain signal output from the encoder 519 to a time-domain sample signal using an Inverse FFT (IFFT) process. The DAC 523 converts the sample signal output from the OFDM modulator 521 to an analog signal. The RF processor 525 up-converts the baseband signal output from the DAC 523 to an RF signal and transmits the RF signal via the antenna.

As constructed above, the controller 511, which is a protocol controller, controls the message processor 509, the message generator 517, the channel estimator 513, the CQI determiner 515, and the CQI transmission period checker 530. That is, the controller 511 can function as the message processor 509, the message generator 517, the channel estimator 513, the CQI determiner 515, and the CQI transmission period checker 530. Herein, they are separately provided to distinguish their functions.

Figure 6:
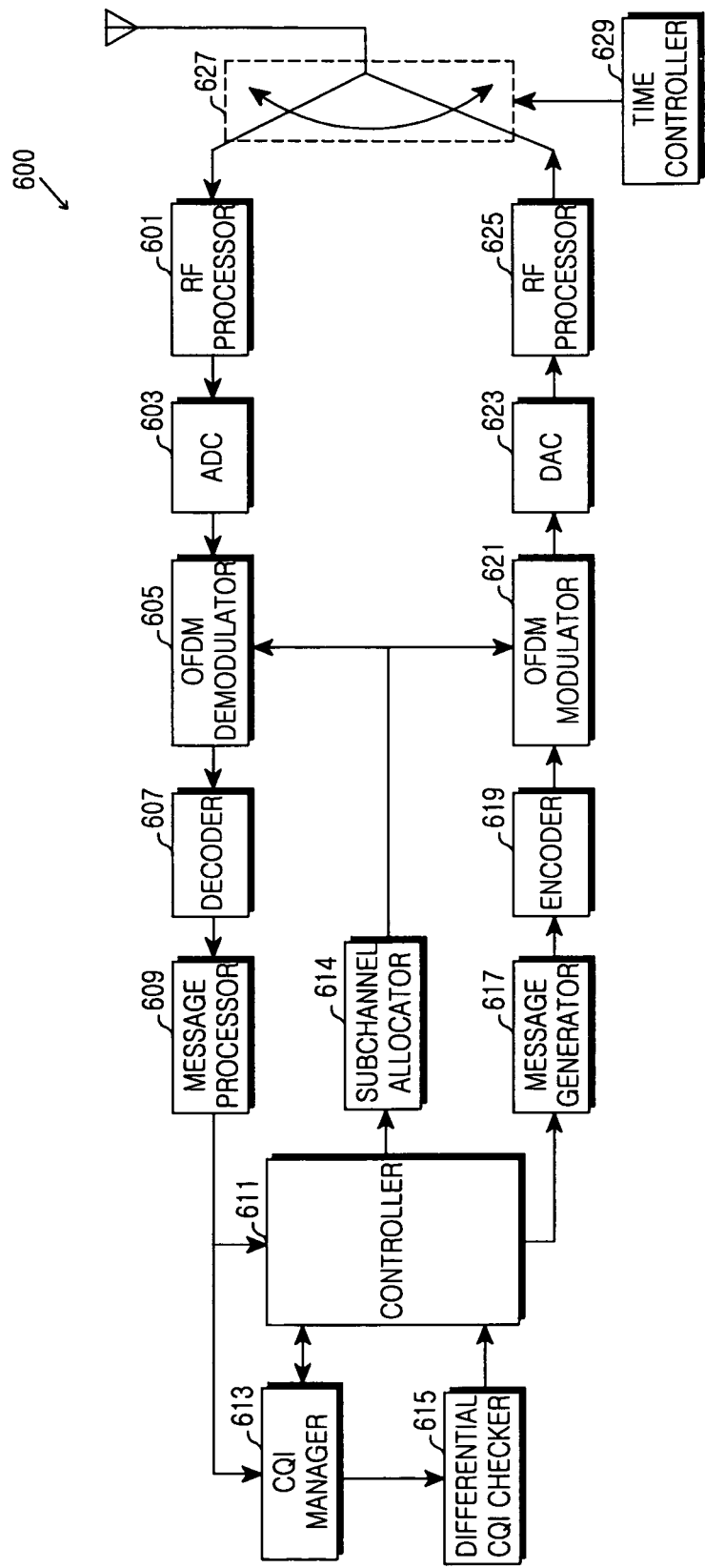
FIG. 6 illustrates a block diagram of the base station for transmitting and receiving the CQI in the broadband wireless communication system according to an exemplary embodiment of the present invention.

FIG. 6 illustrates the base station for transmitting and receiving the CQI in the broadband wireless communication system according to an exemplary embodiment of the present invention.

The base station 600 includes an RF processor 601, an ADC 603, an OFDM demodulator 605, a decoder 607, a message processor 609, a controller 611, a CQI manager 613, a differential CQI checker 615, a message generator 617, an encoder 619, an OFDM modulator 621, a DAC 623, and an RF processor 625.

The RF processor 601, the ADC 603, the OFDM demodulator 605, the decoder 607, the message processor 609, the message generator 617, the encoder 619, the OFDM modulator 621, the DAC 623, and the RF processor 625 function substantially the same as in FIG. 5.

The controller 611 can prepares for the band AMC operation. For example, when the terminal wants the band AMC operation, the controller 611 receives the first control signal requesting to switch from the normal subchannel mode to the band AMC subchannel mode from the terminal, sends the report request message requesting to measure the per band CQI to the terminal, and receives the second control signal informing of the broadband CQI transmission in relation to the per band CQI measurement. When the base station wants the band AMC operation, the controller 611 sends the report request message requesting to measure the per band CQI to the terminal and receives the second control signal informing of the broadband CQI transmission with respect to the per band CQI.

The controller 611 can receive the third control signal requesting to switch from the band AMC subchannel mode to the normal subchannel mode, in the defined period, and notifies the normal subchannel mode operation to a subchannel allocator 614 according to the third control signal.

Before the band AMC operation, the CQI manager 613 receives the broadband CQI in the first corresponding channel and receives the first differential CQI in the second corresponding channel. The broadband CQI is selected to the average or median value of the CQIs measured per band, and encoded with certain bits as the reference CQI for the differential CQI. The first and second corresponding channels are the CQI channel or the fast feedback channel.

The differential CQI checker 615 updates the CQI using the broadband CQI and the first differential CQI. After receiving the first differential CQI, the differential CQI checker 615 receives the second differential CQI and updates the previous per band CQI.

Under the control of the controller 614, the subchannel allocator 614 allocates the band AMC subchannel in the band AMC mode, and allocates the normal subchannel in the normal subchannel mode.

As set forth above, in the broadband wireless communication system, the broadband CQI is defined to minimize the reference value for delivering the differential CQI and the reference CQI and the differential CQI are transmitted over the CQI channel or the fast feedback channel by robustly coding the minimized reference CQI information. Therefore, the overhead in the CQI feedback can be minimized and the CQI reception performance can be enhanced through the most robust encoding. Further, by acquiring the per band CQI with respect to the entire system band, the base station can accomplish the optimal terminal selection in the scheduling.

While the invention has been shown and described with reference to certain exemplary embodiments thereof, it will be understood by those skilled in the art that various changes in form and details may be made therein without departing from the spirit and scope of the invention as defined by the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An operating method of a terminal in a broadband wireless communication system, the method comprising:
   transmitting a broadband Channel Quality Indicator (CQI) for a plurality of bands to a base station over a first control channel;
   checking whether a band Adaptive Modulation and Coding (AMC) subchannel is allocated; and
   transmitting a first per band differential CQI relating to the band AMC subchannel allocated to the base station over a second control channel,
   wherein the broadband CQI comprises an average or median value of CQIs measured per band among the plurality of bands, and the first per band differential CQI has a value based on the comparison result between the broadband CQI and CQIs for the plurality of bands.

2. The operating method of claim 1, wherein the broadband CQI is encoded with a predetermined number of bits comprising a reference CQI for the first per band differential CQI.

3. The operating method of claim 1, further comprising:
   transmitting a first control signal that requests to switch from a normal subchannel mode to a band AMC subchannel mode, to the base station;
   receiving a report request message that requests to measure a per band CQI, from the base station; and
   transmitting a second control signal that informs of the broadband CQI transmission with respect to the per band CQI measurement.

4. The operating method of claim 1, further comprising:
   receiving a report request message that requests to measure a per band CQI from the base station; and
   transmitting a second control signal that informs of the broadband CQI transmission with respect to the per band CQI measurement.

5. The operating method of claim 3, wherein the first control signal and the second control signal comprise unused code words of code words corresponding to a CQI.

6. The operating method of claim 1, wherein the first and second control channels are a CQI channel or a fast feedback channel.

7. The operating method of claim 1, further comprising:
after transmitting the first per band differential CQI, comparing a per band CQI according to a previous differential CQI and a currently measured per band CQI and transmitting a second differential CQI.

8. The operating method of claim 3, further comprising:
when a transition from the band AMC subchannel mode to the normal subchannel mode is required, transmitting a third control signal in a defined period.

9. The operating method of claim 1, wherein the first per band differential CQI comprises differential CQIs for the plurality of bands, and each of the differential CQIs indicates a value based on the comparison result between the broadband CQI and a per band CQI for a band among the plurality of bands.

10. An operating method of a base station in a broadband wireless communication system, the method comprising:
receiving a broadband Channel Quality Indicator (CQI) for a plurality of bands from a terminal over a first control channel;
allocating a band Adaptive Modulation and Coding (AMC) subchannel to the terminal;
receiving a first per band differential CQI over a second control channel after receiving the broadband CQI; and
updating a CQI using the broadband CQI and the first differential CQI,
wherein the broadband CQI comprises an average or median value of CQIs measured per band among the plurality of bands, and the first per band differential CQI has a value based on the comparison result between the broadband CQI and CQIs for the plurality of bands.

11. The operating method of claim 10, wherein the broadband CQI is encoded with a predetermined number of bits comprising a reference CQI for the first per band differential CQI.

12. The operating method of claim 10,
wherein the allocating of the band AMC subchannel to the terminal comprises:
receiving a first control signal which requests to switch from a normal subchannel mode to a band AMC subchannel mode, from the terminal;
transmitting a report request message which requests to measure a per band CQI, to the terminal; and
receiving a second control signal which informs of the broadband CQI transmission with respect to the per band CQI measurement.

13. The operating method of claim 10,
wherein the allocating of the band AMC subchannel to the terminal comprises:
transmitting a report request message which requests to measure a per band CQI, to the terminal; and
receiving a second control signal which informs of the broadband CQI transmission with respect to the per band CQI measurement.

14. The operating method of claim 13, wherein the base station operates in a normal subchannel mode when the second control signal is not received.

15. The operating method of claim 10, wherein the first and second control channels are a CQI channel or a fast feedback channel.

16. The operating method of claim 10, further comprising:
after receiving the first per band differential CQI, updating a previous per band CQI by receiving a second differential CQI.

17. The operating method of claim 12, further comprising:
receiving a third control signal which requests to switch from the band AMC subchannel mode to the normal subchannel mode in a defined period; and
allocating a normal subchannel according to the third control signal.

18. The operating method of claim 10, wherein the first per band differential CQI comprises differential CQIs for the plurality of bands, and each of the differential CQIs indicates a value based on the comparison result between the broadband CQI and a per band CQI for a band among the plurality of bands.

19. An apparatus of a terminal in a broadband wireless communication system, the apparatus comprising:
a controller configured to check that a band Adaptive Modulation and Coding (AMC) subchannel is allocated; and
a Channel Quality Indicator (CQI) determiner configured to generate and transmit a broadband CQI for a plurality of bands to a base station over a first control channel, the CQI determiner further configured to generate and transmit a first per band differential CQI relating to the band AMC subchannel allocated to the base station over a second control channel,
wherein the broadband CQI comprises an average or median value of CQIs measured per band among the plurality of bands, and the first per band differential CQI has a value based on the comparison result between the broadband CQI and CQIs for the plurality of bands.

20. The apparatus of claim 19, wherein the broadband CQI is selected according to an average or median value of CQIs measured per band, and encoded with a predetermined number of bits comprising a reference CQI for the first per band differential CQI.

21. The apparatus of claim 19, wherein the controller is further configured to:
transmit a first control signal that requests to switch from a normal subchannel mode to a band AMC subchannel mode, to the base station,
receive a report request message that requests to measure a CQI per band, from the base station, and
transmit a second control signal that informs of the broadband CQI transmission with respect to the per band CQI measurement.

22. The apparatus of claim 19, wherein the controller is further configured to receive a report request message that requests to measure a per band CQI from the base station, and transmit a second control signal which informs of the broadband CQI transmission with respect to the per band CQI measurement.

23. The apparatus of claim 21, wherein the first control signal and the second control signal comprise unused code words of code words corresponding to a CQI.

24. The apparatus of claim 19, wherein the first and second control channels are a CQI channel or a fast feedback channel.

25. The apparatus of claim 19, wherein the controller, after transmitting the first per band differential CQI, is configured to compare a per band CQI according to a previous differential CQI and a currently measured per band CQI and transmits a second differential CQI.

26. The apparatus of claim 21, wherein, when a transition from the band AMC subchannel mode to the normal subchannel mode is required, the controller transmits a third control signal in a defined period.

27. The apparatus of claim 19, wherein the first per band differential CQI comprises differential CQIs for the plurality of bands, and each of the differential CQIs indicates a value based on the comparison result between the broadband CQI and a per band CQI for a band among the plurality of bands.

28. An apparatus of a base station in a broadband wireless communication system, the apparatus comprising:
- a subchannel allocator configured to allocate a band Adaptive Modulation and Coding (AMC) subchannel to a terminal;
- a Channel Quality Indicator (CQI) manager configured to receive a broadband CQI for a plurality of bands over a first control channel and receive a first per band differential CQI over a second control channel from the terminal; and
- a differential CQI checker configured to update a CQI using the broadband CQI and the first differential CQI,
- wherein the broadband CQI comprises an average or median value of CQIs measured per band among the plurality of bands, and the first per band differential CQI has a value based on the comparison result between the broadband CQI and CQIs for the plurality of bands.

29. The apparatus of claim 28, wherein the broadband CQI is selected according to an average or median value of CQIs measured per band, and encoded with a predetermined number of bits comprising a reference CQI for the first per band differential CQI.

30. The apparatus of claim 28, further comprising a controller configured to:
- receive a first control signal which requests to switch from a normal subchannel mode to a band AMC subchannel mode, from the terminal,
- transmit a report request message which requests to measure a per band CQI, to the terminal, and
- receive a second control signal informing of the broadband CQI transmission with respect to the per band CQI measurement.

31. The apparatus of claim 28, further comprising a controller configured to transmit a report request message requesting to measure a per band CQI, to the terminal, and receive a second control signal informing of the broadband CQI transmission with respect to the per band CQI measurement.

32. The apparatus of claim 30, wherein the controller is configured to operate in a normal subchannel mode when the second control signal is not received.

33. The apparatus of claim 28, wherein the first and second control channels are a CQI channel or a fast feedback channel.

34. The apparatus of claim 28, further comprising a controller configured to, after receiving the first per band differential CQI, update a previous per band CQI by receiving a second differential CQI.

35. The apparatus of claim 30, wherein the controller is configured to receive a third control signal requesting to switch from the band AMC subchannel mode to the normal subchannel mode in a defined period, and allocate a normal subchannel according to the third control signal.

36. The apparatus of claim 28, wherein the first per band differential CQI comprises differential CQIs for the plurality of bands, and each of the differential CQIs indicates a value based on the comparison result between the broadband CQI and a per band CQI for a band among the plurality of bands.

* * * * *